(12) United States Patent
Cheiky

(10) Patent No.: US 8,308,911 B2
(45) Date of Patent: Nov. 13, 2012

(54) SYSTEM AND METHOD FOR ATMOSPHERIC CARBON SEQUESTRATION

(75) Inventor: Michael C. Cheiky, Thousand Oaks, CA (US)

(73) Assignee: Cool Planet Biofuels, LLC, Camarillo, CA (US)

( * ) Notice: Subject to any disclaimer, the term of this patent is extended or adjusted under 35 U.S.C. 154(b) by 246 days.

(21) Appl. No.: 12/651,938

(22) Filed: Jan. 4, 2010

(65) Prior Publication Data
US 2010/0257775 A1 Oct. 14, 2010

Related U.S. Application Data

(60) Provisional application No. 61/143,518, filed on Jan. 9, 2009.

(51) Int. Cl.
C10B 53/08 (2006.01)
C10L 5/10 (2006.01)

(52) U.S. Cl. ............ 201/7; 201/21; 201/33; 585/240; 44/551; 44/563; 44/568; 44/589; 44/599

(58) Field of Classification Search ........... 201/7, 21, 201/33; 585/240; 44/551, 563, 568, 589, 44/599
See application file for complete search history.

(56) References Cited

U.S. PATENT DOCUMENTS

| | | | |
|---|---|---|---|
| 203,016 A | 4/1878 | Edison | |
| 474,230 A | 5/1892 | Edison | |
| 222,390 A | 12/1979 | Edison | |
| 4,268,275 A | 5/1981 | Chittick | |
| 4,421,524 A | 12/1983 | Chittick | |
| 4,487,958 A | 12/1984 | Ream et al. | |
| 4,497,637 A | 2/1985 | Purdy et al. | |
| 4,530,702 A * | 7/1985 | Fetters et al. | 48/209 |
| 4,861,351 A | 8/1989 | Nicholas et al. | |
| 4,992,480 A | 2/1991 | Mahajan et al. | |
| 5,032,618 A | 7/1991 | Marchionna et al. | |
| 5,087,786 A | 2/1992 | Nubel et al. | |
| 5,221,290 A | 6/1993 | Dell | |
| 5,504,259 A | 4/1996 | Diebold et al. | |
| 5,628,877 A * | 5/1997 | Martin | 201/7 |
| 5,756,194 A | 5/1998 | Shogren et al. | |
| 5,820,640 A | 10/1998 | Ikura et al. | |
| 5,857,807 A | 1/1999 | Longo | |
| 5,893,946 A * | 4/1999 | Landis | 106/38.2 |
| 6,133,328 A | 10/2000 | Lightner | |
| 6,227,473 B1 | 5/2001 | Arnold | |
| 6,339,031 B1 | 1/2002 | Tan | |
| 6,548,026 B1 | 4/2003 | Dales et al. | |
| 6,747,067 B2 | 6/2004 | Melnichuk et al. | |
| 6,811,703 B2 | 11/2004 | Elliott | |
| 6,841,085 B2 | 1/2005 | Werpy et al. | |
| 6,923,838 B2 | 8/2005 | Maubert et al. | |
| 6,994,827 B2 | 2/2006 | Safir et al. | |
| 7,033,972 B2 | 4/2006 | Shikada et al. | |
| 7,199,080 B2 * | 4/2007 | Freel et al. | 502/423 |
| 7,226,566 B2 * | 6/2007 | Beierle | 422/604 |
| 7,458,999 B2 | 12/2008 | Schenck et al. | |
| 7,846,979 B2 | 12/2010 | Rojey et al. | |
| 7,888,540 B2 | 2/2011 | Deluga et al. | |
| 7,931,783 B2 * | 4/2011 | Dam-Johansen et al. | 201/3 |
| 7,955,584 B2 * | 6/2011 | Beierle | 423/445 R |
| 2003/0119952 A1 | 6/2003 | Werpy et al. | |
| 2004/0111968 A1 | 6/2004 | Day et al. | |
| 2008/0006519 A1 | 1/2008 | Badger | |
| 2008/0093209 A1 | 4/2008 | Noto | |
| 2008/0216391 A1 | 9/2008 | Cortright et al. | |
| 2008/0223269 A1 | 9/2008 | Paoluccio | |
| 2008/0300435 A1 | 12/2008 | Cortright et al. | |
| 2008/0317657 A1 | 12/2008 | Hall et al. | |
| 2009/0007484 A1 | 1/2009 | Smith | |
| 2009/0139139 A1 | 6/2009 | Tilman et al. | |
| 2009/0151251 A1 | 6/2009 | Manzer et al. | |
| 2009/0183430 A1 | 7/2009 | Schubert et al. | |
| 2009/0217575 A1 | 9/2009 | Raman et al. | |
| 2009/0253947 A1 | 10/2009 | Brandvold et al. | |
| 2009/0308787 A1 | 12/2009 | O'Connor et al. | |
| 2010/0040510 A1 | 2/2010 | Randhava et al. | |
| 2010/0162780 A1 | 7/2010 | Scharf | |
| 2010/0180805 A1 | 7/2010 | Cheiky | |
| 2010/0218417 A1 | 9/2010 | Bauldreay et al. | |
| 2010/0223839 A1 | 9/2010 | Perez et al. | |
| 2010/0257775 A1 | 10/2010 | Cheiky | |

(Continued)

FOREIGN PATENT DOCUMENTS

KR 100819505 3/2008

(Continued)

OTHER PUBLICATIONS

Z. Rosenberg; "More on Commercial Carbon Resistors as Low Pressure Guages," Intl. Jour. of Impat Eng. 34 (2007) pp. 732-742.

(Continued)

Primary Examiner — Nina Bhat
(74) Attorney, Agent, or Firm — Sheppard Mullin Richter & Hampton LLP; David Heisey

(57) ABSTRACT

This invention relates to systems and methods for converting biomass into highly inert carbon. Specifically, some embodiments densify the carbon into anthracite-style carbon aggregations and store it in geologically stable underground deposits. The use of certain embodiments yield a net effect of removing atmospheric carbon via the process of photosynthesis and converting it into hard coal, which can be stored in underground beds that mimic existing coal deposits which are known to be stable for thousands of years.

27 Claims, No Drawings

U.S. PATENT DOCUMENTS

| | | | |
|---|---|---|---|
| 2010/0270505 A1 | 10/2010 | Gallaspy et al. | |
| 2010/0300866 A1 | 12/2010 | Van Aardt et al. | |
| 2011/0023566 A1 | 2/2011 | Lodwig et al. | |
| 2011/0177466 A1 | 7/2011 | Cheiky | |

FOREIGN PATENT DOCUMENTS

| | | |
|---|---|---|
| WO | WO 2009004652 | 1/2009 |

OTHER PUBLICATIONS

R. Buerschaper, "Thermal & Electrical Conductivity of Graphite & Carbon at Low Temperatures," Jour. of App. Physics; (1994) pp. 452-454.

I.M. Lima, "Physiochemical & Adsorption Properties of Fast-Pyrolysis Bio-Chars & their Steam Activated Counterparts," J. Chem. Biotechnical (2010) 85, pp. 1515-1521.

Cheng, CHih-Hsin; "Stability of Black Carbon in Soils Across a Climatic Gradient," Jour. of Geophysical Research Biogeosciences; 113 (2008) G02027; pp. 1-10.

Lehmann, J.; Nutrient Avail. & Leaching in an Archaeological Anthrosol & Ferraisol of the Central Amazon Basin: Fertilizer, Manure.; Plant Soil 249 (2003); pp. 343-357.

Preston, C.M.; Black (Pyrogenic) Carbon: a Synthesis of Current Knowledge & Uncertainities w/Special Consideration of Boreal Regions; Biogeosciences 3 (2006); pp. 397-420.

Tryon, E.H.; "Effect of Charcoal on Certain Physical, Chemical, & Biological Properties of Forest Soils," Ecological Monoraphs, vol. 18, No. 1 (Jan. 1948); pp. 81-115.

Faludi, J.; "World Changing Change Your Thinking a Carbon-Negative Fuel;" Oct. 16, 2007; www.worldchanging.com.

Laird, David; "The Charcoal Vision: A Win Win Scenario," 2008, Agron, J., vol. 100, No. 1, pp. 178-181.

Ogawa; "Carbon Sequestration by Carbonization of Biomass & Forestation; 3 Case Studies," Mitigation & Adaption Strategies for Global Change, vol. 11 (2006); pp. 429-444.

Demirbas, "Effects of Temperature & Particle Size on Bio-Char Yield from Pyrolysis of Agricultural Residues," J. Anal. Pyrolysis, vol. 72 (2004); pp. 243-248.

Kim et al.; Characteristics of Crosslinked Potato Starch & Starch-Filled Linear Low-Density Polyethylene Films, Carbohydrate Polymers, vol. 50 (2002); pp. 331-337.

Norman, et al.; Best Management Practices for Reclaiming Surface Mines in Washington and Oregon, Open-File Report 0-92-2, revised ed. Dec. 1997; www.oregongeology.org Feb. 9, 2010.

E. Gegver & K. Hayek; "A Fully Programmable System for the Study of Catalytic Gas Reactions," 1985 J. Physc. E: Sci. Instrum. 18 836.

D.C. Elliott; "Liquid Fuels by Low-Severity Hydrotreating of Biocrude," Dev. in Thermochemical Biomass Conversion; vol. 1, pp. 611-621.

Dinesh Mohan, "Pyrolysis of Wood/Biomass for Bio-Oil: A Critical Review," Energy & Fuels (2006) 20, pp. 848-889.

Ramesh K. Sharma; "Catalytic Upgrading of Pyrolysis Oil," Energy & Fuels (1993), 7, pp. 306-314.

Thiam Leng Chew, "Catalytic Processes Towards the Production of Biofuels in a Palm Oil and Oil Palm Biomass-based Biorefinery," Bioresource Tech. 99 (2008), pp. 7911-8922.

K. Omata; "Optimization of Cu Oxide Catalyst for Methanol Synthesis under High CO2 Partial Pressure Using Combinatorial Tools," App.Catalyst A: General 262 (2004), 207-214.

Kaoru Takeishi; "Dimethy Ether & Catalyst Development for Production of Syngas," Biofuels (2010) 1(1), pp. 217,226.

Ogawa et al., Carbon Sequestration by Carbonization of Biomass & Forestation; 3 Case Studies:, Mitigation & Adaptation Strategies for Global Change,vol. 11(2006) pp. 429-444.

Demirbas "Effects of Temperature and particle Size on Bio-Char Yield from Pyrolysis of Agricultural Residues", J. Anal. Appl. Pyrolysis, vol. 72 (2004) pp. 243-248.

Kim et al., "Characteristics of Crosslinked Potato Starch and Starch-Filled Linear Low-Density Polyethylene Films," Carbohydrate Polymers, vol. 50 (2002) pp. 331-337.

Norman et al."Best Management Practices for Reclaiming Surface Mines in Washington and Oregon", Open-File Report O-92-2, revised ed., Dec. 1997, www.oregongeology.org Feb. 9, 2010.

\* cited by examiner

SYSTEM AND METHOD FOR ATMOSPHERIC CARBON SEQUESTRATION

REFERENCE TO RELATED APPLICATIONS

This application claims priority to U.S. Provisional Patent Application No. 61/143,518 filed Jan. 9, 2009, the content of which is incorporated herein by reference in its entirety.

FIELD OF THE INVENTION

The present invention is directed towards carbon sequestration, and more particularly, some embodiments of the invention provide systems and methods for converting biomass into highly inert carbon for long-term storage.

DESCRIPTION OF THE RELATED ART

Global warning is one of the top issues of the early 21st century. Several billion tons of fossil fuels are burned worldwide each year. The vast majority of the scientific community believes that about half the carbon from the burning of fossil fuel remains in the atmosphere for at least hundreds of years. Ice core samples indicate that the atmospheric $CO_2$ level has been relatively stable at 280 ppm for tens of thousands of years prior to the beginning of the industrial revolution in the early 1800s. Atmospheric carbon in the form of $CO_2$ has increased 40 percent by the early 21st century to 390 ppm due to the widespread use of fossil fuels. In the last few years, rapid increases in industrialization in the developing world have compounded the rate of increase of fossil fuel usage. There is also some evidence that natural sinks for about half of the $CO_2$ that is emitted from fossil fuel are starting to saturate due to the increasing $CO_2$ concentration or are losing their effectiveness due to global temperature rise. Consequently, scientific projections of future atmospheric $CO_2$ levels from just a decade ago substantially underestimate the current rate of increase of atmospheric $CO_2$. Many scientists are now concerned that the planet is close to a tipping point because increased $CO_2$ emissions are producing thermal effects which are feeding back on themselves and thus further increasing the rate of global warming. Clearly, there is urgent need for technologies to reverse this trend, and specifically for technologies, which can reduce the concentration of atmospheric $CO_2$, i.e., atmospheric carbon.

Each year, about 100 billion tons of atmospheric carbon is absorbed by plants via the process of photosynthesis. However, each year, an approximately equal amount of carbon is returned to the atmosphere by the earth's biomass due to plant respiration, the decay of dead plant matter, wildfires and human directed biomass burning, and other processes. The photosynthesis absorption of carbon and subsequent biomass release of that carbon remained in equilibrium for at least tens of thousands of years prior to the beginning of the industrial revolution as witnessed by ice core samples which have entrapped atmospheric gasses which have been sampled at both northern polar and southern polar ice regions.

Prior to human intervention, a small percentage of plant growth was in geographic regions, which, due to the local climate, topography and hydrology was prone to the development of peat bogs or other biomass preservation mechanisms. Over geologic timescales, these bogs evolve with changing climate and geology such that they become buried under later stage sedimentation and develop through a well documented process of transitioning to lignite coal, then bituminous coal and then, ultimately, anthracite or hard coal. Such coal deposits are found all over the world and contain hundreds of billions of tons of carbon. The carbon concentration in bog peat is relatively low and then progresses to about 50% in wet lignite coal, then to the 70% range in bituminous coal and, ultimately, can be as high as 99% in anthracite coal. High purity carbon, as is found in anthracite coal, is very chemically inert and is not attacked by acids, bases, biological activity or other mechanisms commonly found underground. In many areas, very ancient deposits of coal, as witnessed by their embedded fossils, can be found just a few feet below ground level and are, thus, not attacked by normal environmental mechanisms for at least thousands of years. Over the last few hundred years, bog peat has been actively stripped as a convenient fuel source and has, thus, largely stopped the formation of new coal deposits.

Currently, humanity is not removing any significant amount of atmospheric carbon for long-term storage to offset the large amount of carbon dumped in the atmosphere by fossil fuel burning. In addition to dumping carbon from fossil fuel burning, land development typically releases, on an accelerated basis, carbon from decaying plant matter that had been stored in equilibrium conditions via mature ecosystems. As a result, over the past few years, several modern approaches to $CO_2$ sequestration have been proposed to resolve the problem.

Under one proposal, liquefied $CO_2$) would be injected under high pressure into deep underground structures. The current prototype for this is the use of high pressure $CO_2$ in the recovery of extra oil from declining oil fields. This, however, is not a truly carbon sequestration process because it actually produces more fossil fuel. In addition, the effects of massive amounts of deep $CO_2$ injection are unknown and may produce highly undesirable side effects. For example, $CO_2$ becomes a very powerful supercritical solvent well below the pressures and temperatures that will be used in deep $CO_2$ injection. As a supercritical solvent, the $CO_2$ readily picks up active chemicals that can increase its ability to dissolve substances. Accordingly, with its increased ability to dissolve substances, it is likely that supercritical $CO_2$ injection will not remain stable for geological period. Although similar proposals have been made for deep ocean $CO_2$ injection, the concern for stability over a long period of time remains.

Other proposals involve reacting or absorbing $CO_2$ with other minerals such as calcium oxide. However, such a proposal requires huge quantities of suitable minerals to directly neutralize atmospheric $CO_2$. In the case of calcium oxide, most of the world's calcium is already stored as calcium carbonate, so it cannot be effectively repurposed for more carbon storage.

In addition to $CO_2$ sequestration, some proposals aim to mitigate the problems of the global warming with carbon neutral solutions. One such popular solution is the use of biofuels, which uses the carbon and hydrogen bond energy from the photosynthesis capture of carbon to produce fuels that can be used as an alternative to fossil fuels. Although the burning of biofuels ultimately releases carbon back into the atmosphere, the carbon released originates from the atmosphere and was merely captured by the photosynthesis process. As such, the use of biofuels as fossil fuels is considered to be carbon neutral.

Other carbon neutral solutions include solar, wind and nuclear power stations, which can be used directly for stationary power applications or can be used to charge batteries to power mobile transport applications. These known solutions make no use of carbon at all. Unfortunately, none of the above-identified carbon neutral solutions addresses the $CO_2$

SUMMARY OF THE INVENTION

The invention is directed toward systems and methods for producing highly inert carbon via various pyrolysis products of biomass, in order to address the atmospheric concentration of $CO_2$ and either reduce or balance it against increased fossil fuel carbon emissions.

Some embodiments of the invention involve a method for carbon sequestration, comprising: providing biomass to a pyrolyzing system, wherein the pyrolyzing system generates biochar and filtrate carbon; collecting the biochar and the filtrate carbon; subjecting the biochar and filtrate carbon to a neutral atmosphere at or above temperatures of 250° C. for a predetermined time interval to form inert carbon; and using the inert carbon as coal. In some embodiments, this coal is equivalent to anthracite coal.

Other embodiments of the invention involve a method for carbon sequestration, comprising: providing biomass to a pyrolyzing system, wherein the pyrolyzing system generates biochar and filtrate carbon; collecting the biochar and the filtrate carbon; subjecting the biochar and filtrate carbon to a neutral atmosphere at or above temperatures of 250° C. for a predetermined time interval; and using the biochar as a capture element for the filtrate carbon to form dense carbon aggregates. The method may further entail compressing the carbon aggregates into pellets.

Further embodiments of the invention involve a system for carbon sequestration, comprising: means for providing biomass to a pyrolyzing system, wherein the pyrolyzing system generates biochar and filtrate carbon; means for collecting the biochar and the filtrate carbon; means for subjecting the biochar and filtrate carbon to a neutral atmosphere at or above temperatures of 250° C. for a predetermined time interval to form inert carbon; and means for using the inert carbon as coal. In some embodiments, this coal is equivalent to anthracite coal.

Additional embodiments of the invention involve a system for carbon sequestration, comprising: means for providing biomass to a pyrolyzing system, wherein the pyrolyzing system generates biochar and filtrate carbon; means for collecting the biochar and the filtrate carbon; means for subjecting the biochar and filtrate carbon to a neutral atmosphere at or above temperatures of 250° C. for a predetermined time interval; and means for using the biochar as a capture element for the filtrate carbon to form dense carbon aggregates. The system may further entail means for compressing the carbon aggregates into pellets.

Other features and aspects of the invention will become apparent from the following detailed description, which discloses by way of example, the features in accordance with embodiments of the invention. The summary is not intended to limit the scope of the invention, which is defined solely by the claims attached hereto.

DETAILED DESCRIPTION OF EMBODIMENTS OF THE INVENTION

According to various embodiments of the invention, systems and methods are provided to specifically address the atmospheric concentration of $CO_2$ and either reduce or balance it against increased fossil fuel carbon emissions. Embodiments of the invention produce highly inert carbon via various pyrolysis products of biomass. More specifically, in accordance with some embodiments of the invention, $CO_2$ is sequestered into forms of carbon known to be viable for long-term storage. For example, some embodiments sequester $CO_2$ into coal, which is a form of carbon that is ideal for long-term carbon storage. Coal formations do not require massive amounts of another mineral or compound to facilitate storage.

Biomass input can be of any common type including wood, grasses, leaves, compost, food crop residues, wildfire abatement trimmings, and biomass from land use conversion. The biomass can be fed into any type of pyrolyzing system ranging from a flash pyrolyzer, which operates on a sub-second basis to roasting techniques that require several hours. The pyrolysis process can be oxygen or air fed and, thus, rely on partial oxidation for heating, or, it can be indirectly heated and operate in inert or reducing atmospheres to minimize partial oxidation products. The pyrolyzer can operate in a vacuum, at atmospheric pressure, or at high pressure. It can operate with a gaseous, liquid or supercritical fluid working medium. In most cases, the carbon output from such pyrolysis operations includes two or more components, typically including the following: (A) biochar which is small aggregates of carbon which partially retain some of the cellular structure of the original biomaterial and (B) micro to nanoscale filtrate carbon from the pyrolyzer's gas or liquid working medium The biochar (A) is typically mechanically concentrated and discharged by gravity or pressure from an accumulation point inside the pyrolyzer. Such material can be ground or milled by common techniques conveniently into the 100-mesh size range.

Filtrate carbon (B) is ultra-fine carbon that typically forms from the dehydration and dehydrogenation of gasses and liquids which stream from the biomass during the pyrolysis process. Some of these particles can be extremely fine and are components of the persistent smoke, which permeates the atmosphere from large wildfires. These fine particles must be removed by one or more stages of fine filtration including, but not limited to, centrifugal separation techniques such as cyclones, disk centrifuges, compartmentalized centrifuges, etc. and mechanical filtration techniques such as mechanically wiped filters, reverse flushed filters, etc.

Within some embodiments, the biomass pyrolyzer can be operated for the sole purpose of making sequesterable carbon, while in others it can be operated for multiple purposes. In yet other embodiments, the pyrolyzer can be operated largely for another commercial purpose with carbon capture as an auxiliary function. For example, other purposes for the pyrolyzer include the production of biofuels or chemical feedstock for further processing into fuels or industrial chemicals.

For some embodiments, in order for the pyrolyzer's output carbon to be suitable for long-term geologic storage as hard coal, it must be highly inert and free of residual hydrogen and oxygen compounds or radicals, which could produce undesirable side reactions such as the long-term evolution of methane gas, etc. For example, if the atmosphere is reducing in nature, it could actually hydrogenate leftover surface radicals, which could lead to later stage undesirable reactions. Conversely, an oxidizing atmosphere will effectively clean radicals from the carbon surface, but it will tend to burn the substrate carbon to fowl CO2 and carbon monoxide, thus reducing the carbon yield from the process, therefore, a high temperature neutral atmosphere typically provides the optimal yield of inert carbon. Accordingly, in order to achieve a high level of inertness, some embodiments use the pyrolyzer to optimally subject both types of carbon particles to a neutral atmosphere at temperatures above 250° C. (and preferably 450° C.) for several seconds to several minutes depending upon the rate of gas diffusion through the carbon particle stream. Other embodiments do so as an auxiliary or secondary process after pyrolyzation.

Typically, the ultimate results of the purification process will be a quantity of medium mesh, semi-porous biochar and a large quantity of filtrate carbon ranging in size from 400 mesh down to submicron nano-particles. These ultra-fine particles represent a particular challenge in that when dry, they will very readily disperse in air as a fine dark smoke, similar, but even more persistent than diesel smoke. These particles readily wet and can be locally controlled in water, but water based transport is undesirable because it adds substantial mass to be transported and any localized drying throughout the handling process produces very fine carbon air dispersals.

Eventually, the biochar (A) and the filtrate carbon (B) can be mixed into a water-based slurry and pressed into pellets. The porous nature of the biochar acts as a filtration matrix for the much finer filtrate carbon during wet pressing operations such that the water squeezed out of the press typically runs clear. For hardwood based pyrolysis products, and a 1" diameter press die, the water removal is complete and compaction is complete at about 5 tons per square inch press pressure. The resultant pellet, which can practically be a fraction of an inch tall to over an inch tall, can be directly handled in the semi-dry state with minimum carbon shedding. However, once such a carbon pellet starts to dry, it internally cracks and starts to shed carbon such that after a few days on a lab bench, it becomes very mechanically unsound and will disintegrate and produce a carbon dust plume with minimal handling. As pressed, with a 10 ton per square inch peak pressure, these pellets have an apparent density of about 1.2 which is somewhat higher than bituminous coal and in the lower range of anthracite coal. Elemental carbon has a density of about 2, so both these pellets and natural coals have significant residual porosity, which can be largely explained by the interspatial void volume for densely packed hard spheres which yields about 55% equivalent solid packing density.

In order to meaningfully impact atmospheric $CO_2$ levels, billions of tons of carbon must be sequestered as coal per year. Assuming an effective field density of about 1, a billion tons of carbon, or a gigaton of carbon, commonly referred to in the environmental literature as one GTC requires a volume one mile wide by one mile long by 1,100 feet thick, or one mile by eleven miles by 100 feet thick. Some long term energy/population/atmospheric models would imply a total requirement to store about 4 GTC per year worldwide, or roughly 1 GTC in the Americas, 1 GTC in Europe, 1 GTC in Northern Asia and 1 GTC in Southern Asia. Since there are very few large geographic formations and the transport cost over long distances is very significant, it is much more likely that these requirements would be met by dozens to hundreds of smaller storage sites, initially including mining reclamation sites where carbon sequestration coal would be put back in place of removed coal or other mined minerals. In such cases, the coal strata would typically be 30 to 50 feet in thickness and it would be highly desirable to minimize the required amount of overburden coverage. Such rock, subsoil and topsoil coverage would typically minimally be in the range of the same thickness as the carbon deposit. It is therefore important that the carbon feedstock to this storage process be conveniently transportable over moderate distances using existing infrastructure such as railroads and that it have minimal excess mass, i.e., minimal water content. Since, at an apparent density of 1.2, any added water will substantially increase the transport weight. It is also important that the carbon be inert so as not to contaminate the local ecology and that it be densified to be load bearing in a stable geometry to provide a stable ground surface above it. In order to accomplish all these transport and field bedding goals, the carbon should be pelletized into a size that is suitable for the transport and depositing equipment and for the geology and reclamation use of the storage site. Anthracite coal has been shipped for over 100 years on railroads and already has a standard range of pellet sizes that are in a suitable range for further consideration for these carbon sequestration pellets. The standard small sizes for anthracite coal are as follows:

| Classification | Minimum Size (inches) | Maximum Size (inches) |
|---|---|---|
| Chestnut | 7/8 | 1-1/2 |
| Pea | 9/16 | 7/8 |
| Buckwheat | 3/8 | 9/16 |
| Rice | 3/16 | 3/8 |
| Barley | 3/32 | 3/16 |

In order to produce functional pellets, some embodiments add a binding agent to the biochar plus filtrate carbon mix. Since this process will be run in huge quantities, the binding agent must be readily available, preferably as a natural part of the pyrolysis process, non-toxic, non-polluting, biodegradable, water dispersible, and ultra-low cost. Simple plant starches appear to be an optimal candidate in that all plants store energy in starch grains and plant matter is the fundamental feedstock to the pyrolysis and carbon sequestration process. Simple starches make up the predominant mass of corn, potatoes, food grains and plant tubers. In addition, food starch behavior has been utilized for thousands of years. Starch particles in plants are typically in the micron size range and are typically composed of microcrystalline structures of the carbohydrates amylase and amylopectin. These starch granules are not water soluble at room temperature, but are readily dispersed in water because of their small size. This starch binder can be dispersed in water at about 1%40% concentration, heated to 100° C. for one minute with agitation to hydrolyze the starch into a gel and then mixed one to one on a weight basis with biochar and filtrate carbon. For example, wood based pyrolysis carbons are mixed with a warm solution of 5% cornstarch and pressed at 8 tons peak in a 1" diameter mold with thicknesses in the range of ½" to 1". About 70% of the starch is retained in the pellet, with the balance in the press water, which can be subsequently recycled to make more pellets with proportionally less added starch. The pellet is then dried for 30 minutes at 240° C. in a standard laboratory-drying oven to remove the excess water and crosslink the starch. The resulting pellet can be handled without shedding carbon and is dimensionally stable. This process results in the use of about 70 pounds of starch per ton of carbon pellets or 19 pounds of starch per ton of sequestered $CO_2$. A freshly pressed pellet 0.5" thick ruptures at about 500 pounds loading in a lab compression test. The drying process must achieve pellet core temperatures high enough to crosslink the starch, but not so high as to initiate auto-ignition of the carbon surface when operated in an open-air environment. If the pellets are heated in a neutral atmosphere, they can be dried and crosslinked faster via higher peak temperatures without the danger of igniting their surfaces. However, very high local temperatures will pyrolyzer the binder, causing it to lose its effectiveness. A neutral inert atmosphere for accelerated pellet drying can conveniently use $CO_2$ and water vapor from a pyrolyzer or oxygen depleted recirculating exhaust gas containing nitrogen, $CO_2$ and water vapor. Such recirculating exhaust gas would typically be found in a pyrolyzing station's diesel powered electric generator's exhaust system.

This type of self-filtering pelletizing process tends to concentrate more binder in the center of the pellets than at the surfaces so that the impact strength of the surface, which is important to minimize flaking during transport and bedding is lower than the bulk strength of the pellet. The surface strength of the pellets and their impact resistance can be further improved by spraying a higher concentration starch solution, i.e., 6%-8% on the surfaces of the pellets near the end of the initial drying process and extending the drying process by another 25%-50% to accommodate this surface treatment. The resultant surface coated pellets can be very durable with respect to impacts from one another and thus can simplify transport and bedding handling issues at about a 20% increase in starch loading.

The secondary surface coating has an added benefit of reducing the surface porosity and thus the water uptake of the pellets. Starch bound pellets can retain their strength and handling durability for long periods if they are kept dry. Such a pellet can be submerged in water at room temperature for one week and still retain its shape without shedding carbon, but at a highly reduced mechanical strength. Such water-induced degradation of the pellet structure may be highly desirable in some bed compaction schemes, but it requires keeping the pellet dry until bedding.

Since, for some embodiments, these carbon pellets will be bedded into large coal strata formations in a wide range of climate conditions and under all weather conditions including rainy seasons, freeze-thaw cycles and permafrost strata, particular care with concern to the interaction of the pellets and local water during the bed compaction process is required. Freely dispersing carbon as released from an improper sequestration methodology could become analogous to some of the infamous large-scale sludge ponds that hold billions of gallons of coal mining tailings. Thus, in order to accommodate a wide range of storage site hydrology, the option to substantially vary the submerged water behavior of such pellets is expected to be required.

The water uptake of the pellets and their mechanical strength in water can be greatly enhanced by adding a thin film coating of natural biodegradable water repellant. Pine rosin, which has been used as a natural water proofing agent for thousands of years (e.g. as wood boat caulking agent), works particularly well in this application. Pine rosin is a natural resin made up mostly of abietic or sylvic acid. It is also the main ingredient in natural wood varnishes. The rosin can be harvested from pine trees or extracted from soft wood feedstock coming into the pyrolyzers. For example, a 0.08 mil thick rosin coating on 1" thick, 1" diameter pellets, as described above, requires about 1 pound of rosin per ton of carbon pellets or 1 pound of rosin for every 7,000 pounds of sequestered $CO_2$. Rosin can be heated above its melting point to about 150° C. and sprayed directly on the pellets at the end of their drying cycle. The resulting pellets are water repellant and substantially more durable than their corresponding anthracite coal analogs. Given that common kitchen cling wrap is about 0.15 mil thick, a mechanically rosin coating that is 0.08 mil thick is quite substantial such that, in some applications, thinner coatings could be utilized.

Since atmospheric carbon sequestration involves a huge quantity of carbon to be deposited in a large number of geographic areas from diverse feedstock, and is subject to a wide range of geological and climatological considerations, a range of different pellet sizes and binder and water proofing agent concentrations may be utilized within the general scope of this patent. Some of the basic considerations of pellet design are volume versus surface area, water uptake and controlled degradability at the ultimate storage sites. In general, smaller pellets require less structural binder for transport because of the minimal impact forces that small structures are subjected to. However, small volume structures have proportionally larger surface areas so surface treatment costs increase as size gets smaller. Water repelling agents such as natural rosin are both expensive and can produce too long of a biodecay cycle, that is, they could decay substantially after the initial bedding compaction, causing later stage ground shifts, if not carefully engineered to the proper coating thickness.

Natural coal deposits can be subject to coal fires that can be difficult to extinguish. To minimize the possibility of fire propagation and to discourage the pirating of the carbon deposit for use as fuel, the pellets should be loosely packed with existing overburden. Additionally, for very thick storage deposits, walls of the natural ground strata should be either left in place or re-deposited to folio storage chambers to minimize the possibility of any bulk ground movement due to mixing together two different densities of material with different compressive strengths and water absorption rates. Each site will have to be carefully geologically and hydrologically engineered for proper long-term storage.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the ten is "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for preparing carbon aggregates for underground storage, comprising:
   providing biomass to a pyrolyzing system, wherein the pyrolyzing system generates biochar and filtrate carbon;
   collecting the biochar and the filtrate carbon;
   subjecting the biochar and filtrate carbon to a neutral atmosphere at or above temperatures of 250° C. for a predetermined time interval; and
   combining the resulting biochar and filtrate carbon to form dense carbon aggregates.

2. The method of claim 1, further comprising compressing the carbon aggregates into pellets.

3. The method of claim 2, wherein said compressing comprises compressing with a peak pressure ranging approximately from 4,000 to 20,000 psi.

4. The method of claim 3, wherein prior to compression, the carbon aggregates are mixed with a water-based starch binder having a starch concentration ranging approximately from 1% to 10%.

5. The method of claim 3, wherein prior to compression, the carbon aggregates are mixed with a water-based starch binder having a starch concentration of approximately 4%; and
   the method further comprises drying the compressed pellets in open air at a temperature ranging approximately from 200° C. to 250° C. for approximately 45 minutes to 1 hour and 30 minutes; and
   applying a starch solution with a starch concentration of approximately 6 to 8% to all surfaces of the compressed pellets at the end of the drying.

6. The method of claim 5, wherein the peak pressure is approximately 10,000 psi.

7. The method of claim 4, further comprising drying the compressed pellets in open air at a temperature ranging approximately from 200° C. to 250° C. for approximately 30 minutes to 1 hour.

8. The method of claim 7, further comprising applying a starch solution with a starch concentration of approximately 6 to 8% to all surfaces of the compressed pellets at the end of the drying.

9. The method of claim 4 wherein said peak pressure is approximately 10,000 psi.

10. The method of claim 9, further comprising drying compressed pellets in open air at a temperature of approximately 230° C. for approximately 30 minutes.

11. The method of claim 9, further comprising drying compressed pellets in open air at a temperature of approximately 300° C. for approximately 15 minutes in an inert atmosphere of $CO_2$ nitrogen and water vapor, wherein the $CO_2$ and nitrogen comprises 70% or more vapor pressure.

12. The method of claim 4, further comprising applying a biodegradable water repellant to each pellet.

13. The method of claim 12, wherein said biodegradable water repellant comprises pine rosin, and said applying comprises spraying molten pine rosin on all surfaces of the pellets.

14. The method of claim 13, wherein said pine rosin is applied such that the resulting pellets have a surface coating of pine rosin 0.02 mils to 0.08 mils thick.

15. A method for the underground storage of inactive carbon, said method comprising:
   providing pellets made according to the method of claim 2; and
   transporting the pellets to a long-term underground storage location.

16. The method of claim 15, wherein the long-term underground storage location utilized is a reclaimed surface mine.

17. The method of claim 15, wherein the long-term underground storage location comprises an underground storage facility in which the pellets are stored in layers ranging approximately from 10 to 50 feet deep.

18. The method of claim 17, wherein the pellets are tightly compacted with an overburden material.

19. The method of claim 18, wherein material originally removed to create the long-term underground storage location is used as the overburden material.

20. The method of claim 18, wherein the top layer material scraped away to create the long-term underground storage location is used as the overburden material.

21. The method of claim 18, wherein the overburden material is approximately the same thickness as the underground storage facility's storage seam depth.

22. The method of claim 17, wherein the underground storage facility has a storage packing structure in which the pellets are intermixed with an inert fill material.

23. The method of claim 17, wherein the underground storage facility has a storage packing structure in which groups of pellets are compartmentalized with sections of inert fill material.

24. The method of claim 17, wherein the pellets stored by the underground storage facility further comprise a starch binder, a biodegradable water repellant, or both.

25. The method of claim 14, wherein the pellets further comprise a starch binder.

26. The method of claim 24, wherein the pellets further comprise a biodegradable water repellant.

27. The method of claim 2, wherein said compressing comprises compressing such that the resulting pellets have a density equivalent to anthracite coal.

* * * * *